United States Patent
Webb (10) Patent No.: US 9,879,789 B2
(45) Date of Patent: Jan. 30, 2018

(54) BALL VALVE SEAL (71) Applicant: Cameron International Corporation, Houston, TX (US)

(72) Inventor: Ronald Wayne Webb, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/565,019

(22) Filed: Dec. 9, 2014

(65) Prior Publication Data
US 2016/0161008 A1 Jun. 9, 2016

(51) Int. Cl.
*F16K 5/06* (2006.01)
*F16K 5/20* (2006.01)
*F16J 15/3284* (2016.01)

(52) U.S. Cl.
CPC ......... *F16K 5/0673* (2013.01); *F16J 15/3284* (2013.01); *F16K 5/0657* (2013.01); *F16K 5/0668* (2013.01); *F16K 5/0678* (2013.01); *F16K 5/0689* (2013.01); *F16K 5/208* (2013.01)

(58) Field of Classification Search
CPC .... F16K 5/0673; F16K 5/0689; F16K 5/0657; F16K 5/0668; F16K 5/0678; F16K 5/208
See application file for complete search history.

(56) References Cited

U.S. PATENT DOCUMENTS

| | | | | |
|---|---|---|---|---|
| 3,834,663 A * | 9/1974 | Donnelly | | F16K 1/2285 251/173 |
| 3,940,107 A * | 2/1976 | Allenbaugh, Jr. | | F16K 5/0631 192/223.4 |
| 4,262,688 A * | 4/1981 | Bialkowski | | F16K 5/0663 137/242 |
| 4,552,335 A * | 11/1985 | Alexander et al. | | F16K 5/0673 251/315.05 |
| 4,744,572 A * | 5/1988 | Sahba et al. | | F16K 1/2266 251/174 |
| 4,911,407 A | 3/1990 | Paul, Jr. | | |
| 4,940,208 A | 7/1990 | Kemp | | |
| 5,137,259 A * | 8/1992 | Stein | | F16K 5/0673 251/174 |
| 6,528,168 B1 * | 3/2003 | Matsumoto et al. | | B22D 41/32 277/404 |
| 6,533,241 B1 | 3/2003 | Chen | | |
| 6,698,712 B2 * | 3/2004 | Milberger et al. | | F16K 5/0605 166/324 |
| 6,988,708 B2 * | 1/2006 | Caprera | | F16K 1/2265 251/171 |
| 7,225,831 B2 * | 6/2007 | Hope et al. | | F16K 15/025 137/516.27 |
| 7,690,626 B2 * | 4/2010 | Stunkard | | F16K 5/0642 251/174 |
| 8,424,841 B2 | 4/2013 | Frenzel | | |

(Continued)

OTHER PUBLICATIONS

International Search Report and Written Opinion for PCT Application No. PCT/US2015/061650 dated Feb. 26, 2016, 13 pages.

*Primary Examiner* — Kevin Lee
(74) *Attorney, Agent, or Firm* — Fletcher Yoder, P.C.

(57) ABSTRACT

The disclosed embodiments include a ball valve seal having a main body and a seal finger extending from the main body, wherein the seal finger is configured to extend from the main body and contact and flex against an outer surface of a ball body of the ball valve seal when the ball valve is assembled.

20 Claims, 4 Drawing Sheets

(56) References Cited

U.S. PATENT DOCUMENTS

| | | |
|---|---|---|
| 8,720,854 B2 | 5/2014 | Dalluge et al. |
| 2011/0147635 A1* | 6/2011 | Seveso et al. ........ F16K 5/0678 |
| | | 251/315.08 |
| 2013/0220445 A1* | 8/2013 | Bakhshi et al. ...... F16K 5/0668 |
| | | 137/315.25 |
| 2013/0299730 A1* | 11/2013 | Hills et al. ............ F16K 5/0668 |
| | | 251/315.01 |

* cited by examiner

BALL VALVE SEAL

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves are capable of controlling a flow through a conduit by using a sphere with a port or hole typically centered in the sphere. The valve is opened by rotating the sphere to position the port or hole in line with both ends of the valve. A flow may thus move from a first end of the valve, traverse the port or hole, and continue through the second end of the valve. Likewise, the valve is closed by rotating the sphere so as to position the port or hole perpendicular to the ends of the valve. Unfortunately, seal assemblies, like the seals between the body of the valve and the sphere or ball, in existing ball valves may have numerous components that may be susceptible to leakage and unreliable sealing.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The disclosed embodiments include a ball valve, such as a compact ball valve, having a valve seat or seal housing with improved seals (or seats) configured to reduce or eliminate leakage through the bore-to-seat interface of the ball valve. The disclosed valve seals include a seal finger (or seat finger) configured to contact and engage with a ball body of the ball valve to create a sealing interface. As described in detail below, the seal finger may be a flexible member having a geometry and/or material composition that enables spring-like characteristics of the seal finger. For example, when the ball valve is assembled, the seal finger may be biased towards the ball body to enable improved contact between the seal and the ball body. In the manner described below, the geometry of the seal fingers may also enable utilization of line pressure within the ball valve to increase and improve the seal interface between the seals and the ball body. In certain embodiments, the ball body and/or the seals (e.g., the finger seals) may include a surface treatment or coating to improve performance and wear resistance of the seals.

Additionally, the ball valve seals disclosed herein enable a compact ball valve design suitable for improved installation and maintenance. For example, the disclosed compact ball valve seal design enables the use of metal-to-metal seals, while reducing the need for special installation/removal tools and techniques, such as retracting seat tools and/or sophisticated multiple sealing elements used when servicing traditional ball valves.

Figure 1:
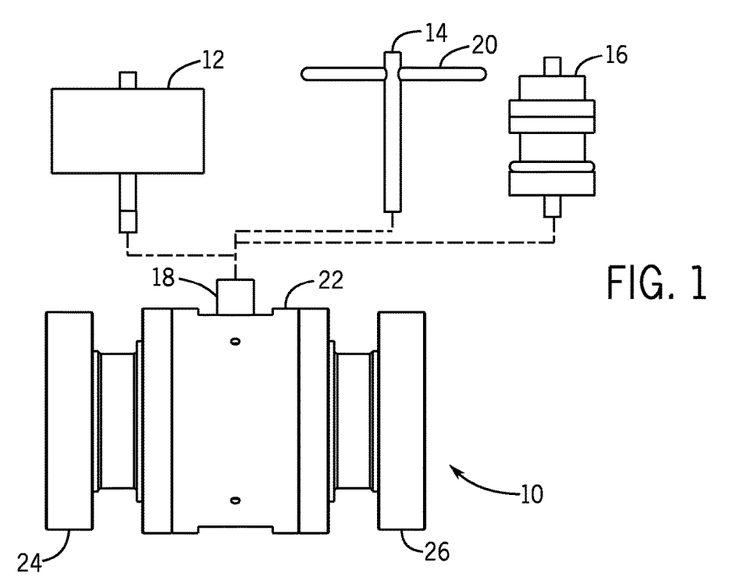
FIG. 1 is a schematic, exploded view of a ball valve and valve actuators, in accordance with an embodiment of the disclosure.

FIG. 1 is a schematic, exploded view of embodiments of a ball valve 10 and a variety of actuators for the valve, which may be a paddle actuator 12, a manual actuator 14, and a powered actuator, such as an electric, pneumatic, and/or hydraulic actuator 16, or any other suitable actuator mechanism. In the exemplary ball valve 10, a stem 18 is connected to the actuator 12, 14, or 16, which opens and closes the ball valve by applying a torque. For example, the paddle actuator 12 may be connected for subsea applications and used by a remotely operated underwater vehicle (ROV). The ROV may rotate the paddle and thus open or close the ball valve 10. Likewise, the manual actuator 14 may be connected and used for above-ground or shallow water applications. A human operator may turn the wheel 20 of the manual actuator 14, thus opening or closing the ball valve 10. Further, the hydraulic actuator 16 may be used for remote valve activation. Accordingly, the ball valve 10 may be remotely opened or closed by remote powered (e.g., hydraulic, electric, pneumatic) actuation. In addition, a gearing assembly or gear set may be used to ensure a desired amount of torque is transferred from the actuator to the stem and, in turn, ball valve. Actuation torque for the ball valve 10 may also be reduced by using certain embodiments disclosed herein, such as ball valve seals having seal fingers, while enabling the use of higher working pressures.

In the illustrated embodiment, the ball valve 10 includes a valve body 22. The valve body 22 (e.g., annular or rectangular body) may be attached to a set of flanged valve ends 24 and 26 (e.g., annular or rectangular flanges), as illustrated. In certain applications, such as applications specifying quick removal and replacement of a valve, the flanged valve ends 24 and 26 may be used to securely connect the valve body 22 to a conduit or pipe. The flanged valve ends 24 and 26 enable easy installation and removal of the ball valve 10 from a conduit such as a flanged pipe. The ball valve 10 may be installed, for example, by using gaskets and a plurality of nuts and bolts suitable for securing the flanged valve ends 24 and 26 to the conduit. In other applications, such as subsea manifold applications, it may be desirable to fixedly couple the ball valve 10 to the conduit, e.g., by using welds. Welding the ball valve 10 to the conduit may reduce weight, create stronger connections, and define a substantially leak-proof passage. Accordingly, the flanged valve ends 24 and 26 may be replaced with a set of weldable valve ends (not shown). The weldable valve ends are capable of withstanding the heat generated during welding and may be capable of meeting ISO 14313 (pipeline valves) and ISO 14723 (subsea pipeline valves) specifications. Indeed, the ball valve 10 may be capable of meeting a variety of valve-related ISO, ANSI, API, ASME, and/or NACE specifications, including subsea specifications. Further, it is to be understood that other valve ends may be used, including combinations of flanged valve ends, weldable valve ends, and/or hub valve ends. That is, the valve body 22 may include a flange valve end 24 at one end of the valve body 22 and a hub valve end at the opposite end, for example.

As discussed in detail below, the ball valve 10 may include one or more improved seals configured to engage with a ball body of the ball valve 10. For example, the improved seals may be installed within or supported by the valve body 22. In certain embodiments, the valve body 22 may support a seat housing that supports the improved seals, while in other embodiments the improved seals may be integrated with the valve body 22. As discussed below, each of the improved seals includes a finger seal configured to engage with a ball body of the ball valve 10 to enable improved sealing engagement between the seals and the ball body. Additionally, in certain embodiments, the ball body and/or the seals (e.g., the finger seals) may include a surface treatment or coating to improve performance and wear resistance of the seals. While the improved seals discussed below are described in context with the valve body 28 and a ball body of the ball valve 10, the improved seals may also be used in other applications. For example, the improved seals may be used with valve stems, other components of ball valves, or other components of other types of valves.

Figure 2:
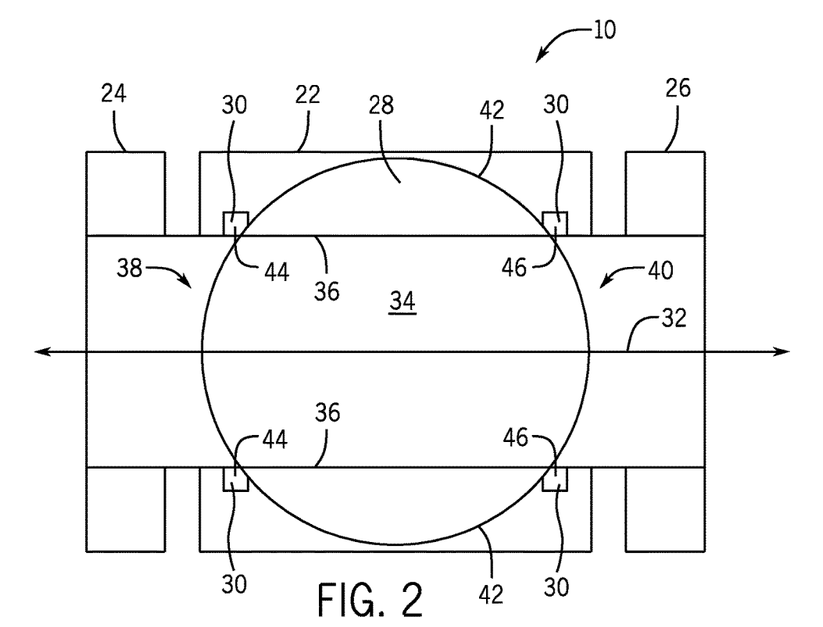
FIG. 2 is a schematic top view of a ball valve, illustrating flanged valve ends, a valve body, a ball body, and improved ball valve seals, in accordance with an embodiment of the disclosure.

FIG. 2 is a schematic top view of an embodiment of the ball valve 10, illustrating a ball body 28 and seals 30 (e.g., annular seals or valve seats) disposed within the valve body 22. The ball body 28, which is illustrated in an open position, is configured to enable a flow 32 in an axial direction. The flow 32 may be driven, for example, by a pump, a compressor, well pressure, or any other device capable of creating a movement of a fluid through a fluid passage 34, e.g., an approximately circular opening or cylindrical bore 34 of the ball body 28. The ball body 28 is disposed within the valve body 22 and may be rotated relative to the valve body 22, so as to open and close the fluid passage 34. Indeed, the rotation of the ball body 28 results in an equivalent rotation of the circular opening 34, thus allowing the flow 32 to enter inwardly into the valve body 22 through one side 38 of the valve body 22, traverse the opening 34 and continue exiting outwardly through the opposite side 40 of the valve body 22. The flow 32 may enter through either of the two sides 38, 40 of the valve body 22 and exit through the opposite side.

In the illustrated embodiment, the ball valve 10 includes the flanged valve ends 24 and 26 (e.g., annular flanges), which may be secured concentrically or co-axially with respect to the valve body 22 (e.g., annular body), as shown in FIG. 1. Accordingly, the flow 30 may enter the flanged valve end 24 (or 26) into the valve body 22, traverse through the opening 34, and exit through the flange 26 (or 24) when the ball valve 10 is in the open position shown. To close the ball valve 10, the ball body 28 may be rotated a quarter turn (i.e., a 90 degree turn) via an actuator (e.g., paddle actuator 12, manual actuator 14, or hydraulic actuator 16 shown in FIG. 1). In this manner, the opening 34 of the ball body 28 is no longer exposed to openings of the flanged valve ends 24, 26, which blocks the flow 32 from passing through the opening 34 of the ball body 28.

To further block the flow 32 when the ball body 28 is in the closed position, the ball valve 10 includes the seals 30 (e.g., annular seals or valve seats), which are supported by the valve body 22. As will be appreciated, the seals 30 engage with an outer surface 42 of the ball body 28 to block the flow 32 from passing between the ball body 28 and the valve body 22. In the illustrated embodiment, the ball valve 10 includes a first seal 44 having an annular configuration disposed on one side 38 of the ball body 28 and a second seal 46 having an annular configuration disposed on the opposite side 40 of the ball body 28. When the ball body 28 is in the open position shown, each annular seal 30 creates a sealing interface disposed about the opening 34 of the ball body 28 between the outer surface 42 of the ball body 28 and the valve body 22. As a result, the seals 30 also block the flow 32 from passing between the ball body 28 and the valve body 22 when the valve 10 is in the open position. The illustrated seals 30 are disposed on the valve body 22 and seal against the ball body 28; however, it is also envisaged that the seals 30 could be disposed on the ball body—e.g., on grooves machined into the ball body—and seal against the valve body 22.

As described below, each of the seals 30 includes a finger element or finger seal configured to engage with outer surface 42 of the ball body 28 to enable improved sealing engagement between the seals 30 and the ball body 28. For example, the finger seal of each seal 30 may have a geometry that enables a spring-like characteristic of the seal 30 to bias the seal 30 against the outer surface 42 of the ball body 28. The biasing quality of the seal 30 towards the ball body 28 may improve the performance of metal-to-metal sealing between the seals 30 and the ball body 28. The biasing quality of the seal 30 may also reduce complexity of installation and maintenance of the seals 30 and the ball body 28.

Figure 3:
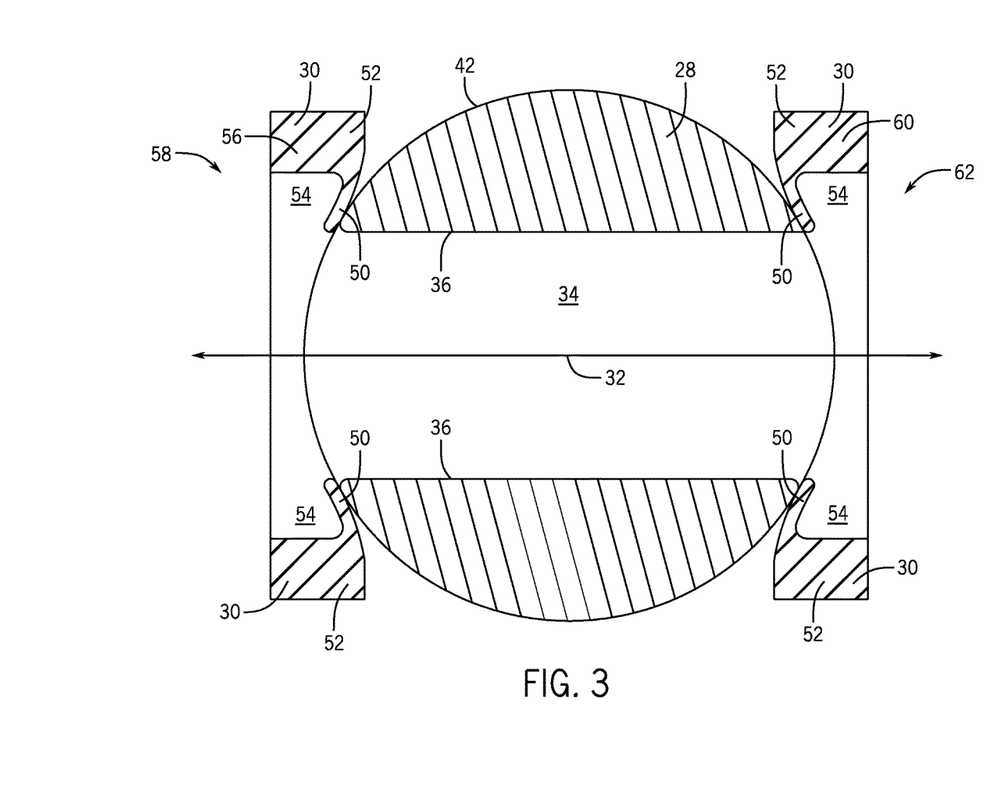
FIG. 3 is a cross-sectional top view a ball valve and ball valve seals, in accordance with an embodiment of the disclosure.

FIG. 3 is a schematic top view of the ball body 28 and the seals 30, illustrating finger seals 50 of each seal 30 engaged with the outer surface 42 of the ball body 28. As mentioned above, the finger seals 50 of each seal 30 have a geometry and/or material specification that provides a spring-like characteristic of the seal 30. For example, each finger seal 50 may be a single continuous annular finger 50, which extends about the central axis of the ball body 28. Alternatively, each finger seal 50 may include a plurality of circumferentially arranged fingers, which overlap and extend radially inward toward the central axis. In either case, the finger seal 50 may protrude in a radial inward direction toward the central axis (e.g., a cantilevered member), and may be perpendicular, acutely angled, or curved relative to the central axis. As shown, the finger 50 of each seal 30 extends from a main body 52 of the seal 30 and is configured to sealingly engage with the outer surface 42 of the ball body 28. The finger 50 of each seal 30 may include a convex surface in contact with the outer surface 42 of the ball body 28. The finger 50 of each seal 30 is a generally elongated member or portion that is configured to form an interference fit with the ball body 28. For example, the fingers 50 may be sized or dimensioned such that, when the ball body 28 is removed from the valve body 22, fingers 50 extend into a space or area that is occupied by the ball body 28 when the ball body 28 is installed within the valve body 22. Thus, when the ball body 28 is installed within the valve body 22, the fingers 50 may engage with the ball body 28 and flex radially outward relative to the ball body 28. As will be appreciated, the elongated geometry of the fingers 50 may enable the flexing of the fingers 50 when the ball body 28 is installed within the valve body 22. As the fingers 50 are forced radially outward relative to the ball body 28, the native (i.e., un-deformed) geometry of the fingers 50 may bias the fingers 50 toward the outer surface 42 of the ball body 28. In this manner, the sealing engagement between the seals 30 and the ball body 28 may be improved. Indeed, the fingers 50 of the seals 30 may maintain a constant sealing interface when the ball body 28 is in the open position, the closed position, and any position in between. The flexing of the fingers 50 may be facilitated without an external biasing mechanism, such as a separate spring, to drive the finger into engagement with the ball body 28.

The elongated geometry of the fingers 50 of each seal 30 may enable additional improvements over existing ball valve seals. For example, in the illustrated embodiment, the fingers 50 extend radially inward from the main body 52 of the seal 30 toward the opening 34 of the ball body 28 when the ball body 28 is in the open position shown in FIG. 3. In other words, the fingers 50 extend from the main body 52 toward the flow 32. As a result, when the ball body 28 is installed within the valve body 22 and the fingers 50 are forced radially outward by the ball body 28, a recess or pocket 54 (e.g., annular space or fluid energizing chamber) is formed by the finger 50 and the main body 52 of each seal 30.

As shown, the recess or pocket 54 is exposed to the flow 32. This configuration enables utilization of the flow 32 to further improve the sealing engagement between at least one of the seals 30 and the ball body 28. For example, in the illustrated embodiment, a first seal 56 is disposed on a first side 58 of the ball valve 10, and a second seal 60 is disposed on a second side 62 of the ball valve 10. When the ball valve 10 is in the open position shown, the flow 32 enters the ball valve 10 from the first side 58, flows through the opening 34 in the ball body 28, and exits the ball valve 10 on the second side 62. The recess or pocket 54 (e.g., fluid energizing chamber) of the first seal 56 is exposed to the flow 32 entering the ball valve 10 on the first side 58 of the ball valve 10. The flow 32 may thus be captured by the recess 54 and further press (e.g., bias or energize) the finger 50 of the first seal 56 against the outer surface 42 of the ball body 28. In this manner, the sealing engagement between the first seal 56 and the ball body 28 is further improved. The same concept applies when the flow 32 passes from the second side 62 to the first side 58 of the ball valve and/or when the ball valve 10 is in the closed position. Any flow entering or attempting to pass through the ball valve 10 may be captured by the pocket or recess 54 (e.g., fluid energizing chamber) of each seal 30. This utilization of the flow 32 further biases or energizes the fingers 50 of each seal 30 toward the outer surface 42 of the ball body 28 and thus improves the sealing engagement between the seal 30 and the ball body 28.

The elongated geometry of the seals 30 (e.g., the finger 50) also improves installation, maintenance, and performance of the ball valve 10. Specifically, the flexibility of the finger 50 of each seal 30 may enable an increase in manufacturing tolerances of the seals 30, the ball body 28, and/or other components of the ball valve 10. Additionally, the elongated geometry of the seals 30 (e.g., the finger 50) may improve installation by allowing for increased misalignment of the ball body 28 relative to the seals 30 during installation. The biasing of the fingers 50 toward the ball body 28 may enable sufficient and/or adequate sealing contact between the seals 30 and the ball body 28 even if the ball body 28 is misaligned relative to the seals 30. Furthermore, in certain embodiments, the seals 30 (e.g., the fingers 50) and/or the outer surface 42 of the ball body 28 may include a surface coating and/or a surface treatment. As discussed below, such surface coatings and/or treatments may be configured to increase wear resistance, chemical resistance, corrosion resistance, or any combination thereof, of the seals 30 and the ball body 28, thereby prolonging the useful life of the ball valve 10 and reducing maintenance. The surface coatings and/or treatments may also reduce friction between the seals 30 and the ball body 28, thereby reducing the torque needed to open and close the ball valve 10. Accordingly, the surface coating may include wear resistant materials (e.g., tungsten carbide), chemical or corrosion resistant materials, low friction materials (e.g., polytetrafluoroethylene, etc.)

Figure 4:
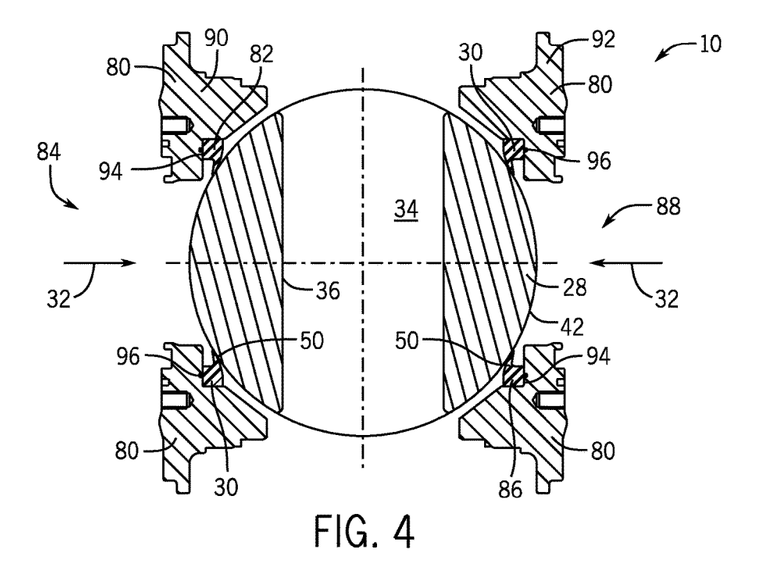
FIG. 4 is a cross-sectional top view a ball valve, ball valve seals, and seal housings, illustrating the ball valve in a closed position, in accordance with an embodiment of the disclosure.
Figure 5:
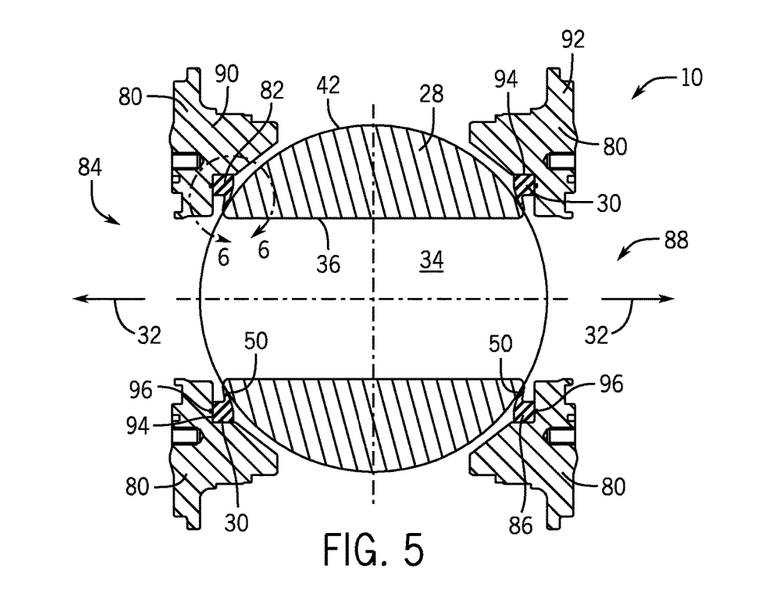
FIG. 5 is a cross-sectional top view a ball valve, ball valve seals, and seal housings, illustrating the ball valve in an open position, in accordance with an embodiment of the disclosure.

FIGS. 4 and 5 are partial cross-sectional top views of an embodiment of the ball valve 10, illustrating seals 30 of the ball valve 10 supported by seal housings 80 (e.g., annular seal housings) of the ball valve 10. The seal housings 80 may be mounted within the valve body 22 of the ball valve 10. FIG. 4 illustrates the ball body 28 in a closed position, while FIG. 5 illustrates the ball body 28 in an opened position.

In the embodiments shown in FIGS. 4 and 5, the ball valve 10 includes a first annular seal 82 disposed on a first side 84 of the ball body 28 and a second annular seal 86 disposed on a second side 88 of the ball body 28. The first annular seal 82 is supported by a first seal housing 90 (e.g., annular seal housing), and the second annular seal 86 is supported by a second seal housing 92 (e.g., annular seal housing). Specifically, the first and second annular seals 82 and 84 are positioned within respective seal seats 94 of the first and second seal housings 90 and 92. As mentioned above, the first and second seal housings 90 and 92 are supported by the valve body 22. Furthermore, the ball valve 10 may also include back up seals 96 disposed between the seal seats 94 and the seals 30. The back-up seals 96 may be annular elastomer seals, O-rings, or other suitable seals. As will be appreciated, the back-up seals 96 function to block flow 32 from passing between the seals 30 and the seal housings 80. In the illustrated embodiment, each seal seat 94 includes one back-up seal 96, however in other embodiments each seal seat 94 may include 2, 3, 4, 5, or more back-up seals 96.

Figure 6:
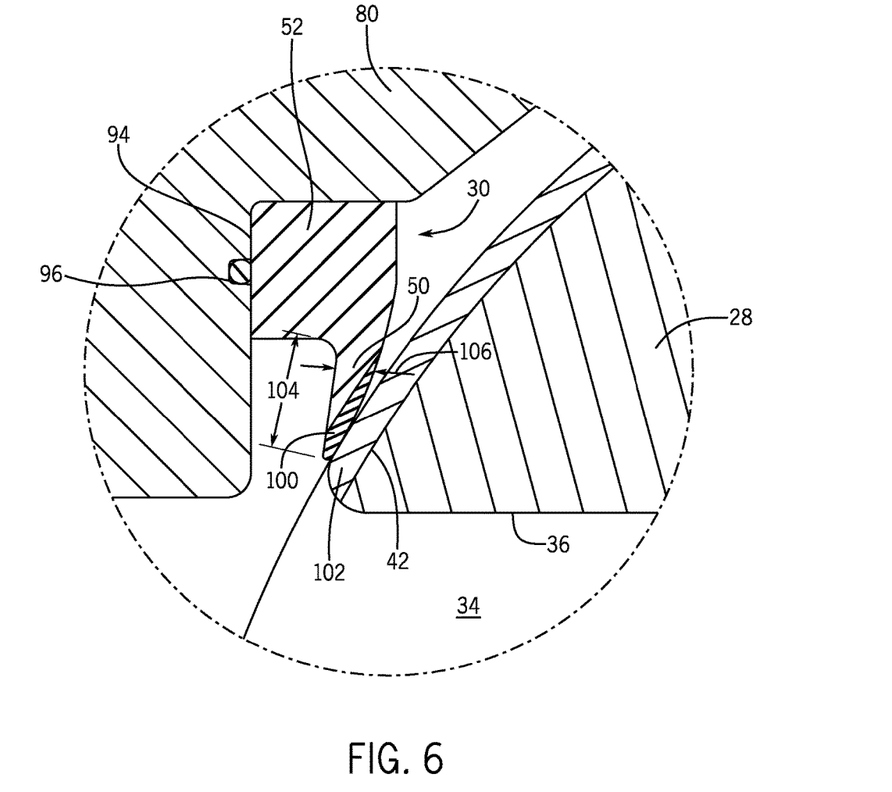
FIG. 6 is a cross-sectional view of a ball valve seal having a surface treatment engaging with a ball valve, in accordance with an embodiment of the present disclosure.

FIG. 6 is a partial cross-sectional view of the seal 30 and the ball body 28, taken within line 6-6—of FIG. 5, illustrating a surface coating 100 of the finger 50 of the seal 30 and a surface coating 102 on the outer surface 42 of the ball body 28. As mentioned above, the surface coatings 100 and 102 may be configured to increase wear resistance of the seal 30 and the ball body 28, decrease friction between the seal 30 and the ball body 28, and generally prolong the useful life of the seal 30 and the ball body 28.

In certain embodiments, the seal 30 and the ball body 28 may be formed from one or more metals or metal alloys, such as titanium, cobalt-chrome, steel, or other suitable metal. For example, corrosion resistant metals may be used to form the seal 30 and/or the ball body 28. In other embodiments, non-metals may be used to form the seal 30 and/or the ball body 28.

In certain embodiments, the seal 30 may be formed entirely from one material. In other embodiments, multiple materials may be used to form the seal 30. For example, a first metal may be used to form the main body 52 and a second metal may be used to form the finger 50 of the seal 30. In such an embodiment, the second metal used to form the finger 50 may have a higher modulus of elasticity than the first metal used to form the main body 52 of the seal 30. By forming the seal 30 of one material, the seal 30 would not need a seal carrier to support the seal 30 in the seal seat of the valve body, for example.

The surface coatings 100 and 102 may be configured to increase wear resistance of the seal 30 and the ball body 28, decrease friction between the seal 30 and the ball body 28, and generally prolong the useful life of the seal 30 and the ball body 28. For example, the surface coating 100 and/or 102 may be a carbon-based coating or other suitable coating having a very high hardness. The surface coating 100 and/or 102 may also be a corrosion resistant coating. In certain embodiments, the surface coating 100 and/or 102 may be bonded to the outer surface 42 of the ball body 28 at a molecular level. As will be appreciated, the high hardness of the surface coating 100 and/or 102 may increase the wear resistance of the seal 30 and/or the ball body 28, while also decreasing the friction between the seal 30 and the ball body 28. Additionally, while the illustrated embodiment shows the surface coating 100 disposed on the finger 50 of the seal 30, other embodiments of the seal 30 may further include the surface coating disposed on an entire surface of the seal 30 (e.g., the main body 52 and the finger 50).

As shown, the finger 50 of the seal 30 also has a length 104 and a thickness or width 106. In certain embodiments, the length 104 may be substantially greater than the thickness 106 of the finger 50. For example, the length 104 may be 50, 60, 70, 80, 90, 100, 120, 140, 160, 180, 200, 300, 400, 500 percent or greater than the thickness or width 106 of the finger. As discussed above, the finger 50 (e.g., annular finger) is designed to be an elongated portion or member of the seal 30 that extends radially inward to contact the ball body 28. The finger 50 of each seal 30 may include a convex surface in contact with the outer surface 42 of the ball body 28 or the surface coating 102 of the ball body 82. In operation, the finger 50 is biased against the ball body 28, while also being flexible to enable improved contact (e.g., sealing engagement) between the seal 30 and the ball body 28.

As discussed in detail above, the disclosed embodiments are directed toward the ball valve 10, such as a compact ball valve, having a valve seat or seal housing (e.g., seal housing 80) with improved seals 30 configured to reduce or eliminate leakage through the bore-to-seat interface of the ball valve 10. The disclosed seals 30 include the seal finger 50, which is configured to contact and engage with the ball body 28 of the ball valve 10 to create a sealing interface. The seal finger 50 may be a flexible member having an elongated geometry that enables spring-like characteristics of the seal finger 50. For example, when the ball valve 10 is assembled, the seal finger 50 may be biased towards the ball body 28 to enable improved contact between the seal 30 and the ball body 28. In other words, the seal 30 and the seal finger 50 may be sized or dimensioned such that the seal finger 50 is forced radially outward, relative to the ball body 28, when the ball body 28 is positioned within the valve body 22 of the ball valve 10.

The geometry of the seal fingers 50 may also enable utilization of line pressure within the ball valve 10 to increase and improve the seal interface between the seals 30 and the ball body 28. For example, when the ball body 28 is installed within the valve body 22, the respective seal finger 50 and main body 52 of each seal 30 may form the pocket 54 (e.g., fluid energizing chamber), which is exposed to the line pressure (e.g., flow 32) in the ball valve 10. The line pressure further biases or energizes the seal fingers 50 towards the ball body 28 to further improve the sealing interface between the seals 30 and the ball body 28.

In certain embodiments, the ball body 28 and/or the seals 30 (e.g., the seal fingers 50) may include surface treatments or coatings 100 and/or 102 to improve performance and wear resistance of the seals 30 and the ball valve 10. For example, the surface coatings and/or treatments 100 and/or 102 may be configured to increase wear resistance of the seals 30 and the ball body 28, thereby prolonging the useful life of the ball valve 10 and reducing maintenance. The surface coatings and/or treatments 100 and/or 102 may also reduce friction between the seals 30 and the ball body 28, thereby reducing the torque needed to open and close the ball valve 10.

While the presently disclosed embodiments may be susceptible to various modifications and alternative forms, specific embodiments have been shown by way of example in the drawings and have been described in detail herein. However, it should be understood that the invention is not intended to be limited to the particular forms disclosed. Rather, the present disclosure is to cover all modifications, equivalents, and alternatives falling within the spirit and scope of the present disclosure as defined by the following appended claims.

The invention claimed is:

1. A ball valve, comprising:
 a valve body;
 a ball body disposed within the valve body; and
 a first seal supported by the valve body, wherein the first seal comprises:
  a first main body; and
  a first seal finger extending from the first main body and contacting an outer surface of the ball body, wherein the first seal finger is configured to be biased towards the outer surface of the ball body by a fluid flow in the ball valve exerting pressure in a first fluid energizing chamber between the first main body and the first seal finger, wherein a convex surface of the first seal finger contacts the outer surface of the ball body, and wherein the convex surface extends along a first length of the first seal finger from a first bottom of first fluid energizing chamber at the first main body to a distal end of the first seal finger.

2. The ball valve of claim 1, wherein the first seal comprises an annular seal having the first main body and the first seal finger extending circumferentially about a first central axis.

3. The ball valve of claim 2, wherein the first bottom of the first fluid energizing chamber at the first main body comprises a cylindrical surface extending along the first central axis.

4. The ball valve of claim 2, wherein the annular seal has an axial length extending from a first axial end to an opposite second axial end along the first central axis, the first finger is disposed along a first length of the axial length, the first fluid energizing chamber is disposed along a second length of the axial length, and the second length is greater than the first length.

5. The ball valve of claim 2, wherein the annular seal has a radial length from an outermost radius to an innermost radius, and the convex surfaces extends along greater than half of the radial length.

6. The ball valve of claim 1, comprising a second seal supported by the valve body, wherein the second seal comprises a second main body and a second seal finger extending from the second main body and contacting the outer surface of the ball body, wherein the first seal and the second seal each comprise an annular configuration, the first seal is disposed on a first side of the ball body, and the second seal is disposed on a second side of the ball body opposite the first side.

7. The ball valve of claim 6, wherein the first seal and the second seal are each configured to be disposed about an opening of the ball body when the ball valve is in an open position.

8. The ball valve of claim 1, wherein the first seal is formed from titanium or cobalt-chrome.

9. The ball valve of claim 1, wherein the first seal, the ball body, or both comprise a surface treatment and/or a surface coating.

10. The ball valve of claim 9, wherein the surface treatment and/or the surface coating comprises a carbon-based material.

11. A system, comprising:
a ball valve seal, comprising:
a main body; and
a seal finger extending from the main body,
wherein the main body is formed from a first metallic material, the seal finger is formed from a second metallic material, the seal finger comprises a surface coating, the seal finger is configured to be biased toward a ball body of a ball valve by a fluid flow in the ball valve exerting pressure in a fluid energizing chamber between the main body and the seal finger, a convex surface of the seal finger is configured to contact the ball body, and wherein the convex surface extends along a length of the seal finger from a bottom of fluid energizing chamber at the main body to a distal end of the seal finger.

12. The system of claim 11, wherein the second metallic material comprises titanium or cobalt-chrome.

13. The system of claim 11, wherein the ball valve seal comprises an annular configuration.

14. The system of claim 11, wherein the seal finger comprises an elongated portion configured to flex against the ball body of the ball valve when the ball valve seal is installed within the ball valve.

15. The system of claim 11, wherein the surface coating comprises a carbon-based coating.

16. A ball valve, comprising:
a valve body;
a ball body disposed within the valve body;
a first seal supported by the valve body, wherein the first seal comprises:
a first main body; and
a first seal finger extending from the first main body and contacting an outer surface of the ball body, wherein the first seal finger is configured to be biased toward the outer surface of the ball body by a fluid within the ball valve exerting pressure in a first fluid energizing chamber between the first main body and the first seal finger, wherein a first convex surface of the first seal finger contacts the outer surface of the ball body, and wherein the first convex surface extends along a first length of the first seal finger from a first bottom of first fluid energizing chamber at the first main body to a first distal end of the first seal finger; and
a second seal supported by the valve body, wherein the second seal comprises:
a second main body; and
a second seal finger extending from the second main body and contacting the outer surface of the ball body, wherein the second seal finger is configured to be biased toward the outer surface of the ball body by the fluid within the ball valve exerting pressure in a second fluid energizing chamber between the second main body and the second seal finger, wherein a second convex surface of the second seal finger contacts the outer surface of the ball body, and wherein the second convex surface extends along a second length of the second seal finger from a second bottom of second fluid energizing chamber at the second main body to a second distal end of the second seal finger,
wherein the first seal is disposed on a first side of the ball body, and the second seal is disposed on a second side of the ball body opposite the first side.

17. The ball valve of claim 16, wherein the first seal and the second seal each comprise an annular configuration.

18. The ball valve of claim 16, comprising a first seal housing supported by the valve body, and a second seal housing supported by the valve body, wherein the first seal is supported by the first seal housing, and the second seal is supported by the second seal housing.

19. The ball valve of claim 18, comprising a first additional seal disposed between the first seal and the first seal housing and a second additional seal disposed between the second seal and the second seal housing, wherein the first and second additional seals each comprises an elastomer.

20. The ball valve of claim 16, wherein the first seal finger comprises a first surface coating, the second seal finger comprises a second surface coating, and the outer surface of the ball body comprises a third surface coating.

* * * * *